(No Model.)

J. SCHWEITZER.
MODE OF PRODUCING FARINACEOUS FOOD.

No. 277,792. Patented May 15, 1883.

Attest:
Wm. F. Sayers
Charles E. Buckley

Inventor:
Julius Schweitzer.
By Knight Bros.
attys

N. PETERS, Photo-Lithographer, Washington, D. C.

United States Patent Office.

JULIUS SCHWEITZER, OF BRIXTON, COUNTY OF SURREY, ENGLAND.

MODE OF PRODUCING FARINACEOUS FOOD.

SPECIFICATION forming part of Letters Patent No. 277,792, dated May 15, 1883.

Application filed November 22, 1882. (No model.) Patented in England September 22, 1882, No. 4,523.

*To all whom it may concern:*

Be it known that I, JULIUS SCHWEITZER, a subject of the Queen of Great Britain, residing at Loughborough Park, Brixton, in the county of Surrey, England, have invented certain new and useful Improvements in the Manufacture of Malted Farinaceous Food for Infants and Invalids, (for which I have made application for Letters Patent in Great Britain, No. 4,523, dated September 22, 1882;) and I do hereby declare that the following is a full, clear, and exact description of the invention, which will enable others skilled in the art to which it appertains to make and use the same.

The invention has for its object improvements in the manufacture of malted farinaceous food for infants and invalids.

Figure 1:
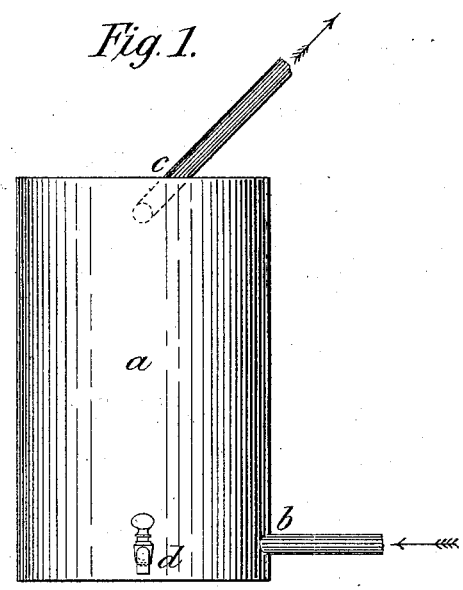
Figure 2:
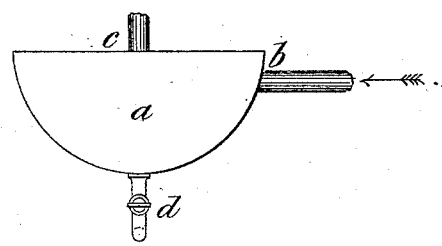

When baking flour in the ordinary dry way the temperature of the oven has to be kept so high that the flour becomes more or less burned. To avoid this, and to insure the baking in a proper and effective way and at a lower temperature, I have discovered that an addition of a small percentage of acid mixed with the raw flour and the introduction of steam into the heated oven greatly assist the operation and materially improve the baking of the flour. The oven I use (but which, however, I do not claim as part of my present invention) is of iron. The bottom and top of the oven consist of steam-jackets. It is twelve feet broad, six feet deep, and eighteen inches high, and holds for one baking three sacks of flour, or seven and one-half hundred-weight. When the oven is hot and the pressure of steam in the jackets is from ten to twenty pounds to the square inch, I allow the steam to enter the oven by means of a pipe and tap. The pipe enters the oven near the upper portion, so that the steam spreads all over the top of the flour and fills, in fact, all the space left vacant between the flour and the top jacket of the oven. During the baking of the flour the steam is caused gradually to rise to a pressure of about thirty-five to forty pounds to the square inch. About every half hour during the baking process I turn the steam off and turn the flour well over, so that the steam may be thoroughly diffused among the flour and permeate and come into contact with every particle of it; and in order to prevent the said steam from introducing into the oven any condensed water, I conduct the steam first into a small vessel, $a$, such as that represented in the accompanying drawings in elevation at Figure 1 and in plan at Fig. 2. This vessel is about eighteen inches high, and capable of holding about two gallons. The steam enters this vessel near the bottom thereof at $b$, and is thence conducted into the oven by a pipe fixed near the top of the vessel at $c$. The condensed water is occasionally removed from the said vessel by means of a tap at $d$. I have found that the steam so introduced into the heated oven does not make the flour pasty, as would be the case if the condensed water were not removed from the steam previous to its introduction into the oven, but causes the flour to become simply somewhat clammy. This assists in conducting the heat right through the mass of flour and in breaking the starch granules without either scorching or unduly melting the baking flour. I have also found that an acid mixed with the raw flour effects a more ready and more perfect baking. Any kind of acid will effect this object; but for the purpose of the present invention—that is to say, for the production of an article of diet—I have found powdered tartaric acid most convenient. I use about two pounds of tartaric acid to each sack of flour containing two hundred and eighty pounds of flour. The higher the temperature at which the steam is introduced and the flour baked the smaller is the amount of acid required to be used, while at a comparatively low temperature rather more acid is required to produce the desired effect.

When the flour is baked in the manner above described, which, at a temperature gradually rising to about 300° Fahrenheit, takes about ten hours, the flour is dried and mixed with about one-third its weight of malt-flour, and for every pound of acid used in the baking I add about twenty ounces of bicarbonate of potash, which converts the tartaric acid into a harmless and pleasant cream of tartar.

Having thus described the nature of my said invention and the mode in which I carry the same into effect, I would have it understood that I lay no claim to the oven used, nor to baked flour, broadly, nor to formation of self-raising flours in which alkali is used; but

What I claim as my invention of improve- ments in the manufacture of malted farinaceous food is—

The mode of producing farinaceous food which consists in taking dry flour, mixing it with a small percentage of acid, substantially as described, to assist the bursting of the starch-granules at a lower temperature than usual, cooking the flour in an atmosphere of steam until the starch-granules are broken, and finally adding an alkali and malt-flour, as described, and for the purpose stated.

J. SCHWEITZER.

Witnesses:
ALFRED H. JONES,
C. M. WHITE.